Jan. 2, 1951  C. BRANDON  2,536,718
VARIABLE POWER OPTICAL SYSTEM FOR TRAINING DEVICES,
MICROSCOPES, TELESCOPES AND THE LIKE
Filed Sept. 17, 1946
FIG. 2.
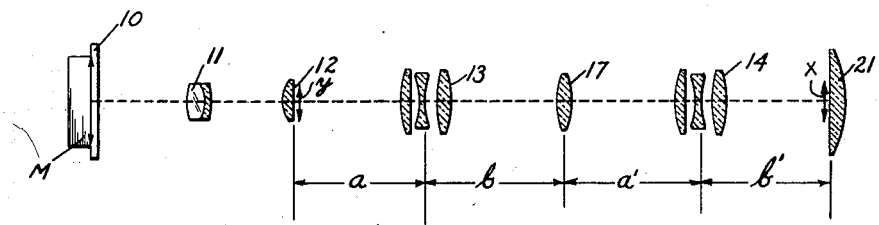
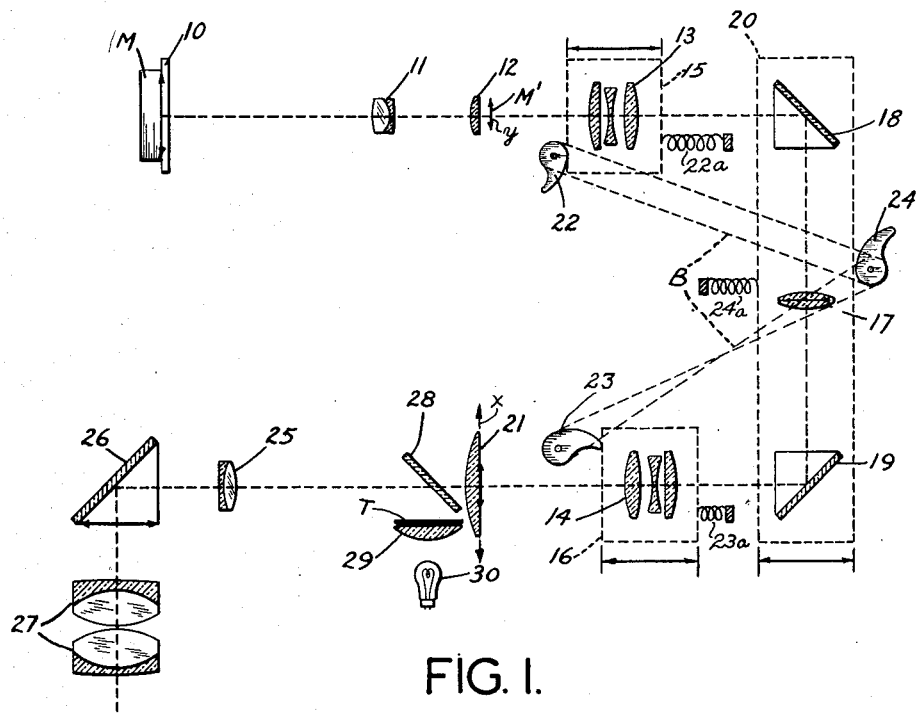
FIG. 1.
INVENTOR.
CHESTER BRANDON Patented Jan. 2, 1951

2,536,718

UNITED STATES PATENT OFFICE 2,536,718

VARIABLE POWER OPTICAL SYSTEM FOR TRAINING DEVICES, MICROSCOPES, TELESCOPES, AND THE LIKE

Chester Brandon, Malverne, N. Y., assignor to Kollmorgen Optical Corporation, Brooklyn, N. Y., a corporation of New York Application September 17, 1946, Serial No. 697,467

6 Claims. (Cl. 88—1)

This invention relates to improvements in optical systems, and it relates particularly to improved variable magnification or power optical systems.

Variable magnification optical systems have been used heretofore in telescopes, microscopes, and the like. These prior systems have a relatively limited range of variable magnification. Thus, for example, the system used heretofore can be varied from a lowest power to not more than about 10 times that power.

In many devices it would be desirable to have a greater range of magnification, for example, from a lowest desired magnification to a magnification 50 to 100 times as great.

A typical example of a device in which a great range of magnification would be desirable is a military training device simulating the conditions encountered with sighting and observation instruments in warfare. In order to simulate effectively such problems as attacks on aircraft, tanks, ships and other moving objects, it is necessary to represent the object being attacked at various ranges and in various positions. In any compact simulated sighting or observation device, it would be necessary to use a scale model of the object as the target and for realism, to include a suitable background. The model must be viewed under various magnifications to represent different ranges and also it would be very desirable to be able to change the size of the image gradually to simulate the approach or departure of the object represented by the model. Inasmuch as the ranges at which the objects are viewed and tracked may vary from 15,000 yards or more to about 300 yards, it will be apparent that a variation in the magnification of the model of at least 50 times is required.

During the change in the power of magnification, it would be highly desirable, also, to maintain the background uniform, that is, not change the magnification of the background or the field of view through the optical system for the reason that the field of a real sighting or observation instrument ordinarily does not vary.

In accordance with the present invention, I have provided an optical system whereby a very large range of magnification or variation in the power of the optical system can be produced.

More particularly, by utilizing a system of field and objective lenses of related focal lengths, I am able to obtain variations in magnification as high as 50 to 100 times as great as the lowest power of the system. Such systems lend themselves admirably to military training devices of the type described generally above and make possible the production of training devices having the ideal characteristics described above.

My new optical system is not limited to use in such training devices and the following description of a typical form of training device should, therefore, be considered as illustrative and not as limiting the invention to such devices.

In a typical training device, a scale model of an object, such as an aeroplane, tank, car or ship is used which is of such size as to represent faithfully the object on which an attack is to be simulated. The model, therefore, is preferably on a sufficiently large scale to make visible the distinguishing features of the object. A 4" scale model is typical of the size of model that may be used. Such a model may be too large for best representation or simulation of ranges to be indicated so its image preferably is reduced by means of a suitable objective lens and a suitable field lens. The imagery at the field lens is transmitted through the variable power magnification system which consists essentially of two objective lenses, and a second field lens between the objective lenses, all of these lenses being of the same focal length. The first objective lens forms an image of the reduced image of the model upon the second field lens. The imagery at the second field lens is then magnified and transmitted to form an image at a third field lens by means of a second variable power objective lens.

The relationship of the lenses of the variable power optical system should be such that the sum of the reciprocals of the conjugate focal lengths of the objective lenses will be equal to the reciprocal of the focal length of the two objective lenses and the cooperating intermediate field lens. With the relationship described generally above, the aperture stop of the first objective will be imaged upon the aperture stop of the second objective lens so that proper focusing of the lenses throughout the entire range of magnifications of the system is obtained. In order to obtain such focusing throughout the entire range of magnifications, it is necessary to shift the lenses in accordance with a non-linear function of the range or magnification. This shifting may be accomplished by means of non-linear cams of suitable design.

The variable power optical system can be rendered more compact by providing prisms or mirrors on opposite sides of the intermediate field lens between the two objective lenses and the field lens so that the paths of light are directed to and from the field lens in parallel lines or substantially so.

The imagery from the variable power optical system may be transmitted to an eyepiece of suitable power for viewing the image.

Inasmuch as a realistic appearance of the model is desired, it is desirable to represent this model in front of a typical background. To this end, the device may be provided with a collimating lens system including a transparent mirror between the variable power system and the eyepiece. A landscape, seascape or skyscape on color film or the like may be projected onto the mirror and viewed through the eyepiece in superimposed relationship to the model to give the effect of the object in its normal environment.

The arrangement described generally above allows the magnification of the system to be varied, thereby increasing or decreasing the apparent size of the simulated object with relation to the background, and simulating the appearance of the object at various ranges or distances from the observer. The object may be made to appear as though it is either approaching or retreating from the observer by gradually varying the magnification of the system.

For a better understanding of the present invention, reference may be made to the accompanying drawings in which, Figure 1 is a diagrammatic representation of the variable power magnification system suitable for use in a military training device; and Figure 2 is the variable power optical system shown with all of the elements thereof in axial alignment to explain the operation of the system more simply.

The optical system disclosed in Figure 1 may be mounted in any desirable type of casing. The shape and structure of the casing are unimportant and are not illustrated inasmuch as they do not form a part of the present invention.

As shown in Figure 1, the optical system may be arranged adjacent to a support 10 of any desired size for receiving a model of an object, such as for example, a tank, car, train or a ship represented by the block M. If desired an aeroplane model may be suspended by means of a thread or supported on a fine wire from the support 10. In order to clearly disclose the distinguishing characteristics of the simulated object, it is usually necessary to use a scale model which is about two to four inches in length depending upon the model represented. Smaller models lack details of structure and are less satisfactory.

When a model of the preferred size is used, it is desirable to reduce optically the image of the model M to about one-half to one-fifth of the size of the model so that the model will occupy a portion of the field of view corresponding to that portion occupied by the real object when viewed through an observation or sighting instrument at the simulated range. This may be accomplished in accordance with the present invention by means of an objective lens 11 in combination with a field lens 12 of suitable characteristics. The smaller image represented by the reference character $M^1$ is then viewed with the variable power optical system embodying the present invention.

This optical system, as illustrated, includes a pair of objective lenses 13 and 14 which are provided with suitable mounts 15 and 16 shown in dotted lines, these mounts being arranged for movement along parallel axes. Interposed between the two objective lenses 13 and 14 is a field lens 17 which, in the preferred form of the invention, has its axis at a right angle to the axes of the lenses 13 and 14. In order to focus the image $M^1$ through the objective 13 at the field lens 17, a right angle reflecting mirror or prism 18 is arranged on the optical axes of the lenses 13 and 17. A similar reflecting prism or mirror 19 is interposed between the field lens 17 and the objective 14. The prisms 18 and 19 and the fields lens 17 are mounted in a suitable frame or casing 20, shown in dotted lines, which likewise is movable toward and away from the objective lenses 13 and 14 without changing the spacing between the field lens 17 and the reflecting surfaces of the members 18 and 19. The imagery transmitted by the object 14 is directed to a third field lens 21 which is fixed with relation to the field lens 12.

The desired variable magnification may be obtained while assuring the proper focusing of the aperture stop of the first objective on the aperture stop of the second objective for all powers of the system by making the objectives 13 and 14 and the interposed field lens 17 all of the same focal length. Moreover, the spacings between the field lenses 12 and 21, respectively, and the objective lenses 13 and 14 are in a predetermined relationship. This relationship must be such that the sum of reciprocals of the conjugate focal lengths of all of the objectives will be equal to the reciprocal of the focal length of any of the three lenses 13, 14, and 17, or stated mathematically $$\frac{1}{f}=\frac{1}{a}+\frac{1}{b}$$

Referring to Figure 2 of the drawings, in which the lenses 12, 13, 17, 14 and 21 are disclosed in alignment, it will be apparent that if, under the conditions specified, the relationship between the conjugate focal lengths indicated as $a$ and $b$ remain the same in all adjustments of the lenses, the desired focusing of the objectives will be obtained. Therefore, the lenses 13, 14, and 17 may be adjusted relatively to change the magnification of the system while keeping the lenses properly and accurately focused so long as $a+b$ of any one objective and an adjacent field lens equals $a+b$ of the other objective and field lens and the relation $$\frac{1}{f}=\frac{1}{a}+\frac{1}{b}$$

is maintained.

The lenses 13, 14, and 17 may be properly adjusted by shifting the lens 13 in its carrier 15 by means of a cam 22 and an opposing spring 22ª, shifting the lens 14 in its carrier or barrel 16 by means of a cam 23 and an opposing spring 23ª, and shifting the field lens together with the reflecting members 18 and 19 by means of still another cam 24 and an opposing spring 24ª, all of the cams 22, 23, and 24 being connected together by means of gears, or as illustrated, by belts B as shown in dotted lines, so that the relationship referred to above is always maintained. The cams 22, 23 and 24 are so connected that they all rotate in the same direction so that, for example, when the cam 22 rotates in a clockwise direction, as viewed in Fig. 1, the lens 13 will move to the left, the lens 17 and associated prisms or mirrors 18 and 19 will move to the right and the lens 14 will also move to the right. These movements are not necessarily equal inasmuch as relative movement between the various lenses is required to maintain the relation referred to above. The cams may be suitably designed to produce the desired relationships for different lenses of any desired focal length. The curvatures of the cams can be calculated or designed by shifting the lenses and plotting the cams on the basis of the focused positions of the lenses at various magnifications.

To complete the optical system described above, the training device may be provided with a suitable objective lens 25, a reflecting member or prism 26 and an eye lens combination 27 by means of which the imagery at the field lens 21 may be viewed. Other objective and field lenses may be included as the purpose demands.

A complete illusion of the object in its normal environment may be created by providing a suitable background for the model. This may be accomplished by introducing behind the field lens 21 a transparent mirror 28 by means of which an image on a color transparency may be projected into the eyepiece. The transparency may be mounted on or in front of a suitable condensing lens 29 and a light source 30 provided so that the image on the transparency appears to lie in the plane of the model M. The model M and the transparency may be suitably illuminated and related so that the model appears naturally in relation to the background. The model should be illuminated more strongly than the transparency so as to cause the image of the model to predominate over and block out the portion of transparency which is superimposed optically on the model.

The characteristics of a suitable combination of lenses for a system of the kind described above may be as follows:

| Lens | Description | Trim | E. F. | F-No. | Working Magnification |
|---|---|---|---|---|---|
|  | (model) | (4" max.) | Mm. |  |  |
| 11 | Target objective |  | 12.5 | 63.3 | 5.0 | 1/6.53. |
| 12 | Target Field Lens |  | 15.6 | 54.3 | 3.5 | 2.91. |
| 13 | Sliding objective lens |  | 34.5 | 146.0 | 4.2 | 2.659 to 1/2.659. |
| 17 | Intermediate Field lens |  | 27.6 | 146.0 | 5.3 | 2.659 to 1/2.659. |
| 14 | Sliding objective lens |  | 12.9 | 146.0 | 11.0 | 2.659 to 1/2.659. |
| 21 | Objective Field lens |  | 73.5 | 238 | 3.2 | 1.05. |
| 25 | Low power objective |  | 11.7 | 486 | 42 | 00. |
| 27 | Eyepiece |  | 30.28 | 27.5 | 13.7 |  |

In the above table, the word "trim" as applied to the model refers to length and as to the lenses refers to the diameter of the aperture.

The term "E. F." means equivalent focal length.

The term "working magnification" refers to the magnification of the individual lens or the variation in magnification obtainable with the lens.

With the lens characteristics indicated in the above table, it is possible to obtain a variation in magnification from about one and one-half power to about 75 power or a total variation of ratio between 1 to 1 and 50 to 1. This magnification is such that when the system is adjusted to indicate an object represented by a model four inches long and 300 yards away, only a portion of the model will be visible through the eyepiece. The visible area of the model M corresponds closely to the area of a real object that would be visible through an observation or sighting instrument at the same range.

A great advantage of the present system is that while the field visible through the variable power magnifying system may vary considerably, the total illusory field through the eyepiece remains unchanged. Therefore, the background remains at the same magnification and the same area of the background is visible at all times while the model covers a greater or lesser amount of the field as the magnification of the system changes. The system therefore is capable of simulating the view seen through a real observation or sighting instrument with high fidelity to the conditions encountered in actual warfare thereby rendering training devices containing the optical system described above particularly effective.

As indicated above, the optical system embodying the present invention is not restricted to use in military training devices. It is also highly useful in microscopes and telescopes, as well as other devices in which large variations in the power of the instrument are required.

It will be understood that the power of the system can be varied by the changing of the focal length of the lenses of the variable power system and their relation and that magnifications as high as 100 times the lowest magnification power can be obtained with the system. Therefore, the form of the invention described above should be considered as illustrative and not as limiting the scope of the following claims.

I claim:

1. A variable magnification optical system comprising a pair of spaced apart field lenses in relatively fixed relation, a pair of axially movable objective lenses between said pair of field lenses, and an intermediate field lens interposed between and movable relatively to said objective lenses to vary the spacing therebetween, said objective lenses and said intermediate field lens having the same focal length, and means for moving said objective lenses and said field lens relatively while maintaining the sum of the reciprocals of the conjugate focal lengths of the objective lenses equal to the reciprocal of said focal length of said objective lenses and said intermediate field lens and the spacing between the objective lenses equal to each of the spacings between the intermediate field lens and each of said pair of field lenses.

2. A variable magnification optical system comprising a pair of objective lenses, a field lens interposed between said objective lenses, all of said lenses having the same focal length, a pair of field lenses on the opposite sides of said objective lenses from said interposed field lens reflecting members on opposite sides of said field lens for reflecting the imagery from one objective lens to said interposed field lens and the imagery from said interposed field lens to the other objective lens, and means for moving said lenses relatively to vary the magnification of said system while maintaining the field lens in the focal plane of one of the objective lenses and the other objective lens focused on said focal plane, and while maintaining the spacing between the objective lenses equal to each of the spacings between the interposed field lens and each of said pair of field lenses, said reflecting members being maintained in fixed spaced relation to said field lens and movable therewith.

3. A training device comprising means for supporting an object to be viewed at different magnifications, a variable power optical system for transmitting an image of said object comprising a pair of relatively movable spaced apart objective lenses and a movable field lens between said objective lenses, all of said lenses of said variable power optical system having the same focal length, a second field lens for collecting the imagery transmitted by said variable power optical system, lenses for viewing said imagery, a third field lens between said supporting means and said variable power optical system means for adjusting said objective lenses relative to said field lens and said object to maintain the sum of the reciprocals of the conjugate focal lengths of the objective lenses equal to the reciprocal of the focal length of said objective and intermediate field lenses, and maintain the spacing between the objective lenses equal to each of the spacings between the movable field lens and each of said second and third field lenses, a transparent reflecting member between said viewing lenses and said second field lens, and means for projecting another image onto said reflecting member for viewing through said viewing lenses in superimposed relation to said imagery of said object.

4. The training device set forth in claim 3 comprising an objective lens and a field lens interposed between said object and said variable power optical system for reducing the size of the image of said object transmitted thereby to said variable power optical system.

5. A training device comprising means for supporting an object to be viewed at different magnifications, a variable power optical system for transmitting an image of said object comprising a pair of relatively movable spaced apart objective lenses and a movable field lens between said objective lenses, all of said lenses of said variable power optical system having the same focal length and working magnification, a second field lens interposed between said supporting means and said variable power optical system, a third field lens for collecting the imagery transmitted by said variable power optical system, lenses for viewing said imagery, and means for moving said lenses relatively in accordance with a non-linear function of said focal length to maintain the spacing between the objective lenses equal to each of the spacings between the movable field lens and each of said second and third field lenses and thereby vary the magnification of said system, a transparent reflecting member between said viewing lenses and said third field lens, and means for projecting another image onto said reflecting member for viewing through said viewing lenses in superimposed relation to said imagery of said object.

6. A variable power lens system comprising a first objective lens movable toward and away from a first fixed field lens to focus the imagery of the latter at a second focal plane, a second lens movable relative to said first lens to maintain the second lens in the second focal plane, a third lens movable toward and away from said second lens to focus the imagery at said second focal plane in a third focal plane, another fixed field lens for transmitting the imagery at said third focal plane to an eye lens, said first, second and third lenses having the same focal length, and means for adjusting the spacings of the lenses to maintain the sum of the reciprocals of the conjugate focal lengths of the objective lenses equal to the reciprocal of the focal length of said lenses and a spacing between said first objective lens and said third lens equal to the spacings between said second lens and each of said first and second field lenses.

CHESTER BRANDON.

REFERENCES CITED

The following references are of record in the file of this patent:

UNITED STATES PATENTS

| Number | Name | Date |
|---|---|---|
| 1,116,069 | Jacob | Nov. 3, 1914 |
| 1,445,284 | Bell et al. | Feb. 13, 1923 |
| 2,388,858 | MacNeille et al. | Nov. 13, 1945 |
| 2,392,781 | Simjian | Jan. 8, 1946 |
| 2,420,633 | Wittel et al. | May 13, 1947 |

FOREIGN PATENTS

| Number | Country | Date |
|---|---|---|
| 21,086 | Great Britain | Sept. 25, 1911 |
| 21,621 | Great Britain | Sept. 25, 1913 |